United States Patent Office 3,053,790
Patented Sept. 11, 1962

3,053,790
POLYMETHALLYL ALCOHOL AND SOLUTIONS AND FIBERS THEREOF
Dennis Aubrey Lewis and Percy Arthur Small, Welwyn Garden City, England, assignors to Imperial Chemical Industries Limited, London, England, a corporation of Great Britain
No Drawing. Filed Aug. 25, 1958, Ser. No. 757,114
Claims priority, application Great Britain Sept. 6, 1957
13 Claims. (Cl. 260—30.8)

This invention relates to new polymeric materials.

According to the present invention we provide new compositions of matter comprising polyallyl alcohol and polymethallyl alcohol of molecular weight greater than 2,000. These polymers may have very high molecular weights, for example, even as high as one to two millions. In general, we find that these polymers with molecular weights between about 50,000 and 360,000 have a particularly useful combination of chemical and physical properties in respect of their uses and the ease with which they may be processed.

By polyallyl alcohol and polymethallyl alcohol we mean polymers in which the repeat unit is

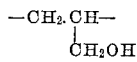

and

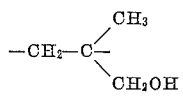

respectively, and the molecular chains of which are composed substantially completely of these repeat units or up to 50% of

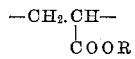

or

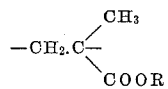

units respectively where R is an alkyl radical. We do not exclude the possibility that other types of molecular grouping may be present to a minor extent, for instance end groups derived from a polymerisation initiator or from chain termination reactions, or branched units derived from chain transfer reactions of the polymer, though the polymers of this invention are substantially linear and when fully-reduced are composed substantially of the alcohol molecular groupings named arranged in head-to-tail fashion. Allyl and methallyl alcohols may be polymerised to polymeric materials by using various types of catalyst or initiator, but there is reason to believe that any high molecular weight polymeric materials obtained directly from these monomers contain substantial amounts of molecular groupings other than those specified above.

The homopolymers of molecular weight greater than 50,000 are insoluble in most solvents, e.g. water, acetone, diethyl ether, methanol, ethanol, benzene, chloroform, carbon tetrachloride, ethyl acetate, aniline, para-xylene, tetrahydrofurane, isobutyl isobutyrate, tertiary butyl Cellosolve, 2 N caustic soda solution, 6 N caustic soda solution, nitromethane, nitropropane, 50-50 carbon disulphide/acetone, ethylene dichloride, ethyl Cellosolve and glycol ether acetate. Good solvents for polymethylallyl alcohol are dimethyl sulphoxide, tetramethyl urea, m-cresol, o-chlor-phenol, ethylene bromhydrin and piperidine. A polymethallyl alcohol of molecular weight 80,000 formed very viscous solutions of 30% w./w. concentration in m-cresol, o-chlor-phenol, ethylene bromhydrin and in piperidine. Solutions in dimethyl sulphoxide or tetramethyl urea were slightly less viscous. Of these solvents, solutions of the polymethallyl alcohol of our invention in piperidine are particularly useful because of the volatility of the solvent. Polymethallyl alcohol of our invention will further form solutions in ethylene chlorohydrin and in hot diethylene glycol or ethylene glycol. Polyallyl alcohol was only swollen by these solvents. Both dissolved in 90% formic acid but it is thought that some esterification occurred. Polymethallyl alcohol also dissolved in glacial acetic acid, again probably with some esterification.

Some of the polymethallyl alcohols of our invention, particularly the polymethallyl alcohol free from ester units, may be crystallised by treatment with a solvent which swells but does not dissolve them, e.g. an alcohol. Particularly good degrees of crystallinity are obtained by immersion of the polymer in a boiling monohydric alcohol of up to 7 carbons. Boiling ethanol is preferred for this process for economy, though, in some cases, greater degrees of crystallinity may be obtained when a higher alcohol, e.g. n-hexanol, is used. X-ray powder photographs of the crystalline polymers show rings corresponding to spacings of about 6.0 and 5.05 A.

The maximum crystalline melting point range determined for crystalline polymethallyl alcohols obtained using a polarising microscope was 204–218° C.

Films and fibres may be produced from the polymers of this invention, preferably the polymers free from ester units. These may be produced from polymethallyl alcohol by melt spinning, evaporative spinning or coagulative spinning. Such films and fibres form a further feature of this invention. They are of good tenacity, are wetted by water but, as indicated for the polymers, are insoluble in most common solvents. The polymethallyl alcohol films and fibres show optimum properties if they are drawn (preferably in two directions at right angles in the case of films) in the solid state to orient their molecules. They may be subjected to a crystallising treatment under a tension sufficient to prevent any substantial retraction of their dimensions. The film or fibre is preferably drawn to increase its dimensions at least three times. Drawing to cause molecular orientation as shown by birefringence improves the mechanical properties of the films and fibres, and crystallising improves their mechanical stability and stability to water and chemical reagents. The films and fibres are best drawn before they are crystallised.

The polyallyl and polymethallyl alcohols of our invention, including the films and fibres thereof, may have plasticisers added to them.

The fibres of this invention are primarily of value for use in textiles. The films are useful for wrapping articles and for surgical applications as they provide a barrier with a high water vapour permeability. The films may also be used as semi-permeable membranes.

The polyallyl and polymethallyl alcohols of this invention may also be esterified with linoleic or linolenic acids to produce ingredients for use in synthetic drying oils.

Our invention also provides a process for the preparation of high molecular weight polyallyl and polymethallyl alcohols.

According to the present invention polyallyl and polymethallyl alcohols of molecular weight greater than 2,000 are prepared by a process in which at least 50% of the ester groups of polyacrylic and polymethacrylic esters of corresponding high molecular weight are reduced by treatment with a reducing agent in a liquid reaction medium which does not react with the polymeric ester or the reducing agent, said reducing agent being soluble in said medium and being either a complex aluminium hydride or an aluminium trialkyl of the formula Al(.CH$_2$.CHR$_1$R$_2$)$_3$ where R$_1$ and R$_2$ are alkyl radicals.

Suitable reducing agents for use in the process of this invention are lithium aluminium hydride and aluminium triisobutyl.

Suitable liquids for use as the reaction medium in the process of this invention with complex aluminium hydrides are N-ethyl morpholine, dioxane, tetrahydrofurane, tetrahydropyrane and ethylene glycol dimethyl ether. Suitable liquids for use with compounds of the said formula

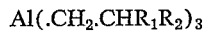

Al(.CH$_2$.CHR$_1$R$_2$)$_3$ are aromatic hydrocarbons. The liquid and other reaction ingredients used should be freed from any material which reacts with the reducing agent, e.g. peroxides and water, before they are used. It is preferred to use a liquid which dissolves both the polymeric ester and the reducing agent. Tetrahydrofurane is a particularly useful liquid for use as the reaction medium as it dissolves both the polymeric ester and lithium aluminium hydride and it is relatively inexpensive.

The use of a suspension of the reducing agent in a solution thereof results in an economy in the amount of solvent used.

The process of the invention may be continued until the polyester is fully reduced to the polyalcohol. Reduction to the polyalcohol is shown by an infra-red spectrum absorption band in the product at 1040 cm.$^{-1}$. Completion of the reduction is shown by the disappearance of an infrared absorption band in the product at about 1730 cm.$^{-1}$. Completion of the reduction is not necessary for the production of useful products. Whilst complete reduction is desirable for the production of the most highly crystallisable polymers, partially reduced polymers have the advantage that they are compatible with a greater range of plasticisers than the fully reduced polymers.

During the process of this invention the polymeric alcohol is precipitated as a white gel. This precipitation normally first occurs before the reduction is complete and for complete reduction further reaction is required. To ensure that the reaction goes to completion, more than the stoichiometrical quantity of reducing agent necessary for complete reduction is preferably used. Thus we find that a convenient weight ratio is 0.5 to 1 of lithium aluminium tetrahydride to 1 of polyacrylate or polymethacrylate.

Whilst it is sometimes possible to separate the white gel of polyalcohol from the reaction mixture by filtration, a simpler method for separating it is to remove the reaction medium by evaporation, e.g. by passing a current of dry air, and to wash the resulting dry white powder with dilute acid to remove inorganic impurities. Cold hydrochloric acid is preferred for this purpose in order to avoid agglomeration of the polymer and to obtain a polymer of maximum solubility. After washing with hydrochloric acid the polymer may be further washed with water. Alternatively, when a reducing agent is used which gives rise to alkali-soluble residues, an aqueous solution of an alkali such as sodium or potassium hydroxide may be used to remove inorganic residues from the polymer, followed by washing with water. The further washing is preferably carried out at a temperature less than 30° C. in order to obtain a finely divided product.

Our invention is illustrated, but in no way limited, by the following examples. The molecular weights quoted are values calculated from the specific viscosities of the polymers.

*Example 1*

To a solution of 6.0 g. of polymethyl methacrylate of molecular weight 156,000 in 150 ml. dry tetrahydrofurane, a solution of 4.0 g. lithium aluminium hydride in 100 ml. dry tetrahydrofurane was added dropwise under dry nitrogen, with stirring. A gelatinous precipitate formed when 30 ml. had been added. The reaction mixture was kept at 60° C. for 3 days, and then cooled. The precipitate was filtered off and dried, giving a white powder. This was treated with warm 4 N sulphuric acid, hot water and boiling chloroform and dried, giving 4.3 g. of a white, coarsely granular powder (99% of the calculated yield). The infra-red spectrum of this material showed no band at 1730 cm.$^{-1}$ but had a very strong band at 1040 cm.$^{-1}$.

*Example 2*

A solution of 6.0 g. of polymethyl methacrylate of molecular weight 470,000 in 216 ml. dry tetrahydrofurane was added slowly to 6.0 g. of lithium aluminium hydride in 200 ml. tetrahydrofurane, with stirring, under dry nitrogen, at 20° C. After 45 minutes a white gel precipitated. The reaction mixture was then heated to 60–65° C. for 2 days and cooled. The solvent was evaporated in a stream of dry air, and the solid residue treated with cold 2 N hydrochloric acid, cold water and boiling chloroform. The weight of the dry product was 4.1 g. (95%). The absorption spectrum was like that of the product of the previous example.

*Example 3*

7.0 g. of lithium aluminium hydride in 200 ml. dry tetrahydrofurane was added to 10.0 g. of high molecular weight polymethyl acrylate dissolved in 255 ml. dry tetrahydrofurane; a gelatinous precipitate soon formed. The mixture was heated at 50–60° C. for 2 days, and the solid filtered off and the solvent removed in a stream of dry air. The white powder was treated with warm 2 N hydrochloric acid, and then with water, and dried. A yield of 6.0 g. of a hard, white, granular material (89%) was obtained. The infra-red absorption spectrum showed that the reduction of the ester grouping to the methylol grouping (—CH$_2$OH) was substantially complete.

*Example 4*

To a clear solution of 10.0 g. of high molecular weight polymethyl acrylate in 500 ml. anhydrous tetrahydrofurane was added, with stirring, a solution of 5.0 g. LiAlH$_4$ in 180 ml. tetrahydrofurane. Addition time was 60 minutes, and after this period the reaction mixture, a white gel suspended in a milky liquid, was stirred at 20° C. for 48 hours, and then at 60–65° C. for 72 hours. Filtration afforded a white gel which dried out rapidly to give a white powder. Treatment with hot 4 NH$_2$SO$_4$ and water gave a white, rubbery lump. Prolonged drying over P$_2$O$_5$ in a vacuum desiccator finally yielded the polyallyl alcohol as a very hard, off-white solid (6.0 g.). This product showed no infra-red absorption band at 1730 cm.$^{-1}$ due to carbonyl but exhibited an intense absorption band at 1040 cm.$^{-1}$, attributable to the —CH$_2$OH group.

*Example 5*

A solution obtained from 6.0 g. of LiAlH$_4$ in 500 ml. anhydrous tetrahydrofurane was added at 20° C. to a solution of 12.0 g. polymethyl methacrylate of molecular weight 95,000, sold under the registered trademark "Diakon," in 500 ml. dry tetrahydrofurane, and the reaction mixture was maintained at 60–65° C. for 3 days.

The product was isolated by drying of the gel, treatment with hot 4 N H$_2$SO$_4$, water and chloroform, to give an 83% yield of a white, granular solid which showed a peak in the infra-red at 1735 cm.$^{-1}$ corresponding to ca. 30% unreduced polymethyl methacrylate.

*Example 6*

To a stirred solution obtained from 6.0 g. of LiAlH$_4$ in 200 ml. tetrahydrofurane was added at 20° C. a solution of 6.0 g. polymethyl methacrylate of molecular weight 470,000 in 216 ml. dry tetrahydrofurane. The solution became turbid, and after 45 minutes (15 minutes after the addition was completed) a white gel was precipitated. The reaction mixture was kept at 60–65° C. for 48 hours.

Isolation of the polymethallyl alcohol was accomplished by removal of the solvent from the gel to give a white powder, followed by treatment with cold 2 N hydrochloric acid (24 hours), cold water (24 hours) and boiling chloroform (2 hours).

The product, a fine, white powder, weighed 4.1 g. (97%). Perusal of the infra-red spectrum showed it to be fully reduced, since it exhibited no absorption in the 1730 cm.$^{-1}$ region, but absorbed strongly at 1040 cm.$^{-1}$.

Example 7

6.0 g. of polymethyl methacrylate of molecular weight 138,000 in 250 ml. anhydrous tetrahydrofurane was reduced by addition of the polymer solution to a solution obtained from 5.0 g. LiAlH$_4$ in 200 ml. tetrahydrofurane. After 18 hours at 60–65° C. the resulting gel was removed and the tetrahydrofurane vaporised by a current of air. The white powder thus obtained (19.0 g.) was treated with cold 2 N HCl (2 hours), cold water (2 hours), and was dried in a vacuum desiccator, to give 4.2 g. (98%) polymethallyl alcohol as a fine white powder. The infra-red spectrum showed no carbonyl absorption.

Example 8

A solution of LiAlH$_4$ (from 5.0 g.) in tetrahydrofurane (200 ml.) was added to a solution of 6.0 g. of polymethyl methacrylate of molecular weight of 138,000 in 250 ml. dry tetrahydrofurane at 20° C. with stirring. The reaction mixture was stirred at 20–25° C. for 60 hours and then at 60–65° C. for 5 hours.

The polymethallyl alcohol, isolated and treated as in Example 6, weighed 4.0 g. (95%). The infra-red spectrum showed no bands in the carbonyl region, but possessed a high-intensity peak at 1040 cm.$^{-1}$.

Example 9

A solution of 16.0 g. polymethyl methacrylate (molecular weight of 24,000) in 300 ml. anhydrous tetrahydrofurane was added over 30 minutes to a stirred suspension of 12.0 g. lithium aluminum hydride in 200 ml. tetrahydrofurane.

The mixture was agitated at 65° C. under nitrogen for three days, and was then cooled before the addition of 50.0 ml. ethyl acetate. The mixed solvents were removed by distillation and the resulting fine grey powder was treated with 600 ml. cold 4 N sodium hydroxide solution, giving a finely divided white solid. This product was filtered off, and was then treated with 200 ml. cold 2 N sulphuric acid for 3 hours and filtered. The filter cake was washed with water until the washings were neutral, and it was then dried in vacuo at 60° C., giving 11.5 g. (98%) polymethallyl alcohol as a fine, white powder.

Example 10

Reduction of 16.0 g. polymethyl methacrylate (molecular weight 138,000) as described above afforded 11.4 g. (98%) polymethallyl alcohol.

Example 11

To a solution of 8.0 ml. aluminium triisobutyl in anhydrous xylene (60 ml.) at room temperature (22° C.) was added over 10 minutes a solution of 3.0 g. polymethyl methacrylate (molecular weight of 111,000) in 40 ml. dry benzene. The temperature of the mixture rose to 35° C. during the addition, and the solution tended to thicken.

The mixture was boiled under reflux at 100° C. for 18 hours and then the benzene was removed by distillation and refluxing was continued at 135° C. for 24 hours. The resulting thick, pale-yellow gel was cooled and air-dried, giving 7.6 g. of a pale-yellow powder. Treatment of this powder with aqueous 2 N potassium hydroxide overnight, followed by washing with water gave, after drying in vacuo, 2.4 g. of a very pale-yellow powder. The infra-red spectrum of this product indicated that approximately 70% of the ester groups in the original polymethyl methacrylate had been reduced.

Example 12

3.0 g. polymethyl methacrylate (molecular weight of 32,000) was dissolved in a mixture of benzene (30 ml.) and xylene (100 ml.). The benzene was distilled off until the still-head temperature was 130° C. and then aluminium triisobutyl (8.0 ml.) was added over 20 minutes to the boiling solution. The temperature of the mixture was maintained at 130° C. for 24 hours, after which time the product was isolated as described in Example 11. There was obtained 2.3 g. white powder which contained 30% residual ester groups.

Example 13

Polymethyl methacrylate was prepared by use of magnesium diisopropyl as catalyst, as described in Example 1 of U.S. application, Serial No. 746,589, filed July 7, 1958, and was reduced as described in Example 1 of the present application. It had a calculated molecular weight of 78,500 and was amorphous as made when tested by X-ray powder photography.

On treatment of this sample with ethanol at the boiling point for 3 hours, the powder so obtained was found to be crystalline. The X-ray powder photograph exhibited two strong lines at 6.0 and 5.05 A.

Example 14

Polymethyl methacrylate was prepared as described in Example 5 of U.S. application, Serial No. 719,823, filed March 7, 1958, now abandoned, with n-amyl magnesium bromide catalyst, and was reduced as described in Example 9 of the present application. 100 mgm. of this amorphous polymethallyl alcohol (calculated molecular weight of 114,000) was treated with boiling ethanol for 3 hours and afforded a crystalline residue. Crystallinity was also induced in a similar sample by simple treatment with cold ethanol for 3 days. Characteristic lines in the X-ray powder photograph appeared at 5.9 A. and at 5.05 A.

Example 15

Polymethyl methacrylate of molecular weight 343,000 was prepared by use of an ethyl magnesium bromide catalyst as described in Example 1 of U.S. application, Serial No. 719,723, filed March 7, 1958, now abandoned, and was reduced according to Example 9 of the present application. Although the product was amorphous as made, crystallinity was induced by any one of the following:

(a) Treatment with boiling ethanol for 6 hours.
(b) Treatment with cold ethanol for 10 minutes.
(c) Treatment with cold n-hexanol for 24 hours.
(d) Treatment with boling n-hexanol for 4 hours.

The latter afforded the most crystalline sample. All the above specimens exhibited strong lines in the X-ray powder photograph at 5.95 A. and 5.07 A. (±2%). In addition (d) showed extra lines at 7.45 A. and 4.5 A.

Example 16

Amorphous polymethyl methacrylate was prepared by the following procedure. 100 ml. redistilled monomer was added over 30 minutes to a stirred solution of 6.5 ml. lithium butyl in a mixture of methyl cyclohexane (114 ml.) and benzene (500 ml.) under N$_2$. The mixture was stirred for 2 hours after the addition of monomer had been completed, by which time the viscosity had increased markedly. The polymer was isolated by precipitation from the viscous solution with methanol, and was then dried giving a 95% yield (based on monomer) of polymethyl methacrylate, molecular weight 138,000 (determined viscometrically), which was amorphous to X-rays. The polymethallyl alcohol derived from the polyacrylic ester by reduction with lithium aluminium hydride also proved to be amorphous to X-rays. However, when subjected to the action of boiling ethanol for 6 hours, the sample was found to be crystalline, since lines appeared in the X-ray powder photograph at 7.55, 6.05, 5.05 and 4.5 A.

The following compounds were found to be ineffective crystallising agents: acetone, water, chloroform, benzene, diethyl ether, di(n-propyl) ether, di(n-butyl) ether.

*Example 17*

0.5 g. polymethallyl alcohol produced as described in Example 9 (calculated molecular weight 78,000) was dissolved in 1.5 ml. dimethyl sulphoxide containing 3 drops diethylene glycol, and the resulting solution was left open to the air after placing on a glass plate. After 3 days, the solvent had evaporated off, leaving a thin, transparent pliable film which became brittle after some days.

*Example 18*

350 mgm. of polymethallyl alcohol (molecular weight 78,000) was dissolved in 1.0 ml. tetramethyl urea containing 35 mgm. diethylene glycol, and the resulting clear solution was poured on to a glass plate and left in the air for 48 hours. There was obtained a pliable, transparent film which, however, became brittle within 4 days.

*Example 19*

Repetition of Example 2, with the omission of the diethylene glycol, afforded a clear film. This undrawn, unplasticised film was, however, very brittle.

*Example 20*

A clear solution of 300 mgm. polymethallyl alcohol (molecular weight 78,000) in 1.0 ml. dimethyl sulphoxide containing 30 mgm. diethylene glycol was poured on to a glass plate and left open to the atmosphere at 100° C., for 18 hours. The film so obtained was initially pliable but became brittle after 5 days.

*Example 21*

Polymethallyl alcohol prepared as described in Example 15 was melt cast into the shape of a rod and this was used to spin a filament using a melt spinner as described in British specification No. 527,532, the spinneret having a single hole. The melt spinning temperature was 240° C.–270° C. The filament was drawn to 3.5 times its original length over a stationary pin heated to 130° C. The drawn filament had a tenacity of 1.2 g. per denier at 15% extension.

*Example 22*

A 25% w./w. solution in dimethyl sulphoxide of a polymethallyl alcohol prepared as described in Example 5 from a polymethyl methacrylate of molecular weight 95,000 which is sold under the registered trademark "Diakon," was prepared and spun into a coagulating bath containing a 10% w./w. solution of calcium chloride in water. Coagulating baths at various temperatures between room temperature and 60° C. were used to produce filaments. The filaments obtained were further drawn in hot water.

*Example 23*

A 30% w./w. solution in tetramethyl urea of the polymethallyl alcohol prepared as described in Example 15 was spun into water at 90° C. while being stretched. The thread was allowed to dry in a stretched condition and was then further stretched in hot water. The drawn thread obtained showed a degree of crystallinity on X-ray examination.

*Example 24*

A 30% w./w. solution in tetramethyl urea of the polymethallyl alcohol used in Example 22 was spun into water at 90° C. while being stretched. The thread was allowed to dry in a stretched condition and was then further stretched in hot water. The drawn thread obtained had a tenacity of 1.5 g. per denier and an elongation at break of 40%.

We claim:

1. A polymethallyl alcohol of molecular weight of at least about 50,000 and not greater than about 2,000,000.
2. A polymethallyl alcohol as set forth in claim 1 in which the molecular weight is between 50,000 and 360,000.
3. A polymethallyl alcohol as set forth in claim 2 in which substantially all the substituent groups are selected from the class consisting of methyl and hydroxymethyl groups.
4. A solution of the polymethallyl alcohol of claim 2 dissolved in an organic solvent selected from the group consisting of piperidine, dimethyl sulphoxide, tetramethylurea, meta-cresol, orthochlorphenol and ethylene bromhydrin.
5. A solution of polymethallyl alcohol as set forth in claim 4 in which the solvent is piperidine.
6. A solution of polymethallyl alcohol as set forth in claim 4 in which the solvent is dimethylsulphoxide.
7. A solution of a polymethallyl alcohol as set forth in claim 4 in which the solvent is tetramethylurea.
8. A solution of a polymethallyl alcohol as set forth in claim 4 in which the solvent is metacresol.
9. A solution of a polymethallyl alcohol as set forth in claim 4 in which the solvent is orthochlorphenol.
10. A fiber comprising the polymer according to claim 2.
11. A fiber according to claim 10 characterized in that it has been drawn in the solid state to increase its length at least three times, the molecules in said fiber being molecularly oriented as shown by birefringence.
12. A crystalline polymethallyl alcohol of molecular weight between about 50,000 and 2,000,000 in which substantially all the substituent groups are selected from the class consisting of methyl groups and hydroxymethyl groups and which shows an X-ray absorption pattern corresponding to spacings of about 6.0 and 5.05 A.
13. A fiber comprising crystalline polymethyallyl alcohol as set forth in claim 12, the molecules in said fiber being molecularly oriented as shown by birefringence.

References Cited in the file of this patent

UNITED STATES PATENTS

| | | |
|---|---|---|
| 2,353,023 | Freund et al. | July 4, 1944 |
| 2,431,224 | Ballard | Nov. 18, 1947 |
| 2,467,105 | Adelson et al. | Apr. 12, 1949 |
| 2,545,183 | Whetstone | Mar. 13, 1951 |
| 2,610,360 | Cline et al. | Sept. 16, 1952 |
| 2,823,421 | Scarlett | Feb. 18, 1958 |

OTHER REFERENCES

Schildknecht: "Vinyl and Related Polymers," John Wiley and Sons, New York (1952), pages 341–350.

Noller: "Chemistry of Organic Compounds," W. B. Saunders Co., Philadelphia (1951), page 152.

Schildknecht: "Vinyl and Related Polymers," John Wiley & Sons, New York (1952), pages 186–226.